United States Patent [19]

Miller et al.

[11] 4,400,137
[45] Aug. 23, 1983

[54] ROTOR ASSEMBLY AND METHODS FOR SECURING A ROTOR BLADE THEREWITHIN AND REMOVING A ROTOR BLADE THEREFROM

[75] Inventors: Arthur J. Miller, North Huntingdon; Charles H. Kostors, Greensburg, both of Pa.

[73] Assignee: Elliott Turbomachinery Co., Inc., Jeannette, Pa.

[21] Appl. No.: 221,076

[22] Filed: Dec. 29, 1980

[51] Int. Cl.³ ............................................. F01D 5/32
[52] U.S. Cl. ........................... 416/220 R; 416/193 A; 416/221
[58] Field of Search ............... 416/220 R, 220 A, 221, 416/500, 193 A

[56] References Cited

U.S. PATENT DOCUMENTS

| | | | |
|---|---|---|---|
| 2,108,435 | 2/1938 | Hagen | 416/211 |
| 2,753,149 | 7/1956 | Kurti | 416/220 R |
| 2,843,356 | 7/1958 | Hull, Jr. | 416/220 R |
| 3,165,294 | 1/1965 | Anderson | 416/220 R |
| 3,199,836 | 8/1965 | Moyer | 416/220 R |
| 3,846,041 | 11/1974 | Albani | 416/97 |
| 3,904,317 | 9/1975 | Cardin et al. | 416/220 R |
| 3,930,751 | 1/1976 | Straslicka et al. | 416/220 R |
| 4,046,488 | 9/1977 | Wickham | 416/210 |

Primary Examiner—Louis J. Casaregola
Assistant Examiner—Jeffrey A. Simenauer
Attorney, Agent, or Firm—Donald F. Daley; David J. Zobkiw

[57] ABSTRACT

A rotor assembly and methods for securing rotor blades within and removing rotor blades from rotor assemblies. The rotor assembly comprises a rotor disc defining a plurality of blade grooves, and including a plurality of tenons disposed between the blade grooves and defining a plurality of pin sockets radially extending inward from outside surfaces of the tenons; and a plurality of rotor blades, each blade including a root disposed within a blade groove to secure the blade against radial movement, and a blade platform overlaying a tenon and defining a radially extending pin aperture. The rotor assembly further comprises a plurality of locking pins radially extending through the pin apertures and into the pin sockets to secure the rotor blades against axial movement, each pin including a head and a base to limit radial movement of the pin.

4 Claims, 7 Drawing Figures

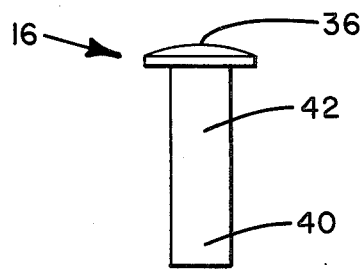
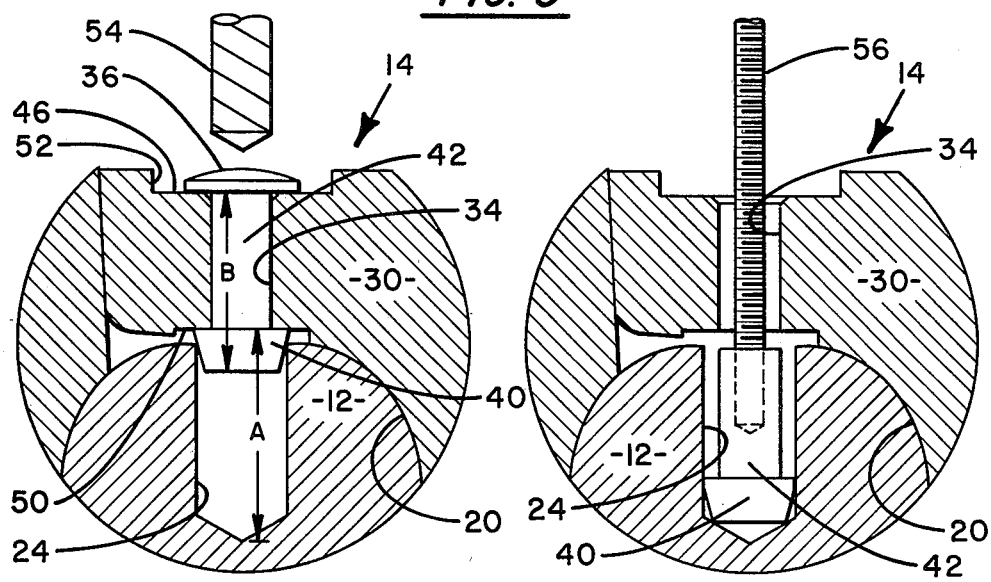
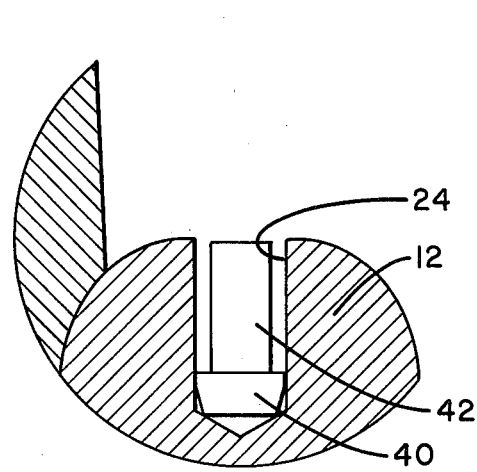
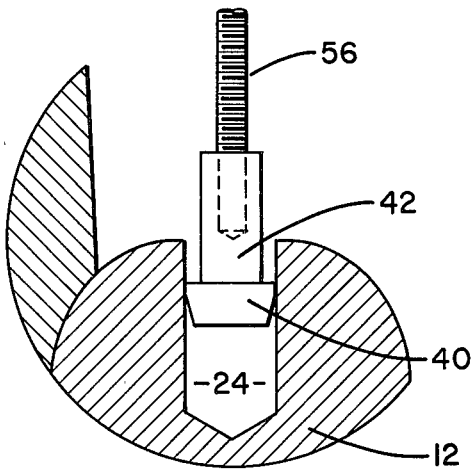

ROTOR ASSEMBLY AND METHODS FOR SECURING A ROTOR BLADE THEREWITHIN AND REMOVING A ROTOR BLADE THEREFROM

BACKGROUND OF THE INVENTION

This invention generally relates to rotor assemblies, and more particularly to securing rotor blades within and removing rotor blades from rotor assemblies.

In many rotor assemblies, as is well known in the art, a plurality of blades are secured to a rotor disc by axially sliding the blade roots into complementary slots or grooves formed in the disc. Because of this axial or side entry feature, blades of this type are commonly referred to as side entry blades. Once located within the rotor disc, the blades are then secured to the disc against axial movement, effectively locking the blades to the disc. To remove a blade, for example to repair or to replace the blade, the blade is first unlocked from the rotor disc to allow axial movement of the blade root, and then the root is slid out of the disc groove, freeing the blade from the disc.

Prior art blade locking arrangements employed with rotor assemblies of the general type described above often involve considerable time or expense. For example, in many cases, the blade root structure is peened over the rotor disc slot. This, however, requires significant amounts of hand working and thus is costly and time consuming. Moreover, removal of the peened blade structure from the rotor disc may be difficult, entailing substantial time and effort. In other cases, the blades are secured to the rotor disc by a plurality of locking pins, with each pin preventing axial movement of a selected blade and the pin itself held in place by an adjacent blade. With such an interrelated blade locking arrangement, often a plurality of blades must be removed from the rotor assembly in order to remove any one particular blade.

With other arrangements employing locking pins, a worker must have access to and manipulate in some manner both ends of the locking pin. Providing this access may comprise other design considerations; and, where the access is provided, the necessary manipulation may require skilled labor and be relatively time consuming. In still other cases, the locking pin has an atypical shape or design and must be specially manufactured just for one, specific type of rotor assembly.

SUMMARY OF THE INVENTION

In view of the above, an object of this invention is to improve rotor assemblies having side entry rotor blades.

Another object of the present invention is to improve methods for securing side entry rotor blades within and removing these blades from rotor assemblies.

A further object of this invention is to lock side entry rotor blades to and unlock these blades from a rotor disc by using simple, readily available tools and equipment.

Still another object of the present invention is to lock a blade locking pin itself within a rotor assembly in a manner requiring access to only one side of the pin and without requiring rotating or twisting movement of the locking pin. These and other objectives are attained with a rotor assembly comprising a rotor disc defining a plurality of blade grooves, and including a plurality of tenons disposed between the blade grooves and defining a plurality of pin sockets radially extending inward from outside surfaces of the tenons; and a plurality of rotor blades, each blade including a root disposed within a blade groove to secure the blade against radial movement, and a blade platform overlaying a tenon and defining a radially extending pin aperture. The rotor assembly further comprises a plurality of locking pins radially extending through the pin apertures and into the pin sockets to secure the rotor blades against axial movement, each locking pin including a head and a base to limit radial movement of the pin.

A BRIEF DESCRIPTION OF THE DRAWINGS

Figure 1:
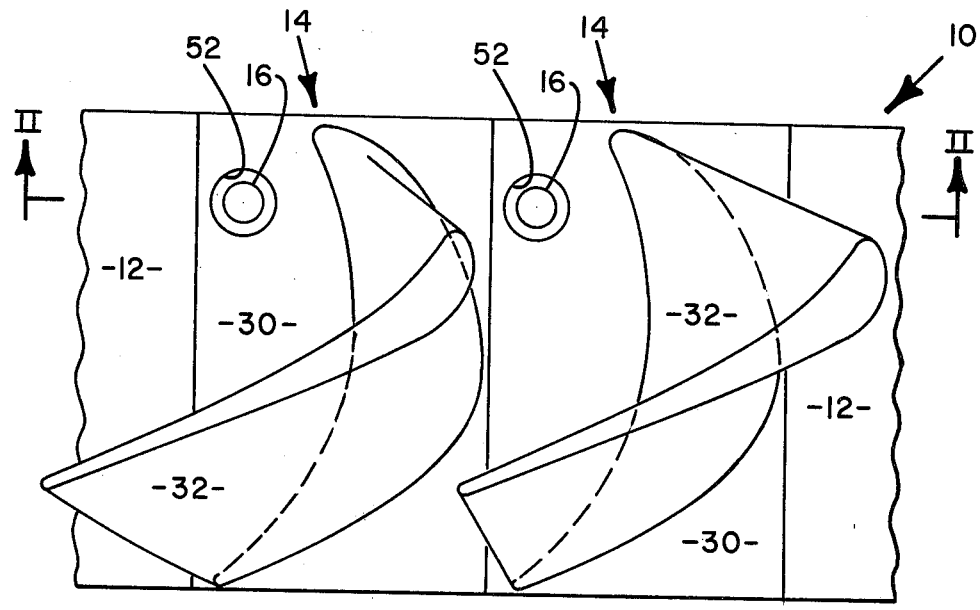
FIG. 1 is a partial plan view of a rotor assembly incorporating teachings of the present invention.
Figure 2:
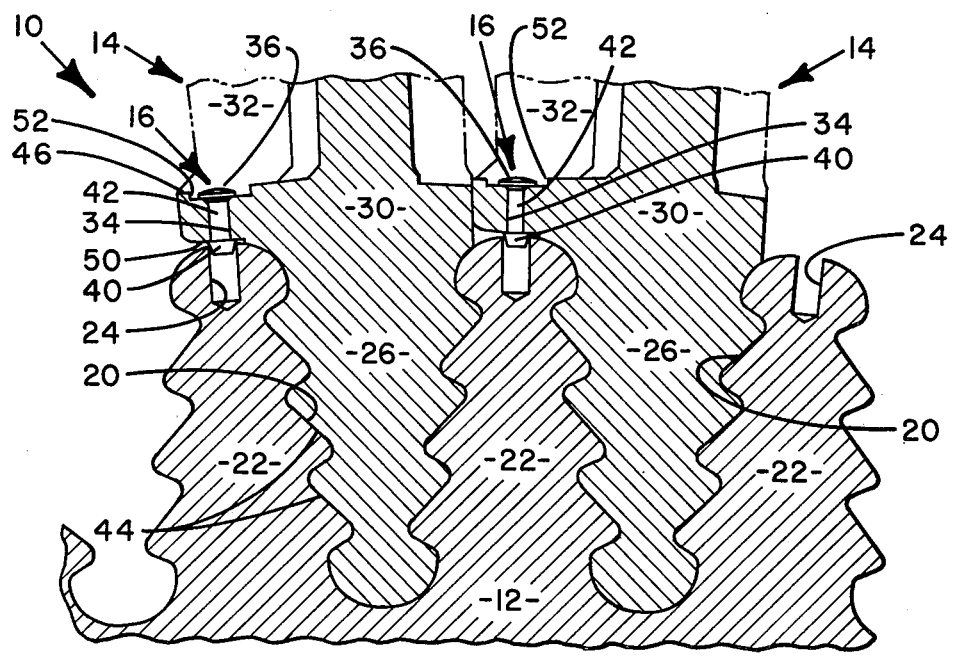
FIG. 2 is an enlarged sectional view taken along line II—II of FIG. 1.

FIG. 3 is a side view of a locking pin employed in the rotor disc assembly shown in FIGS. 1 and 2; and FIGS. 4 through 7 are enlarged sectional views illustrating how the locking pins of the rotor disc assembly shown in FIGS. 1 and 2 may be removed therefrom.

DETAILED DESCRIPTION OF THE PREFERRED EMBODIMENT

Generally, the present invention relates to rotor assemblies. While the specific assembly herein described in detail is of the type usually employed in turbomachinery, it should be made clear that the present invention is not necessarily limited to this particular usage and is contemplated as having broader application.

Referring now to the drawings, particularly FIGS. 1 and 2, there is illustrated portions of rotor assembly 10 generally including rotary support disc 12, a series of radially extending rotor blades or buckets 14 secured thereto, and a plurality of pins 16 which lock the rotor blades to the rotor disc. Rotor disc 12 defines a plurality of blade grooves or slots 20 and includes a plurality of tenons 22 which, in turn, define pin sockets 24. Rotor blades 14 comprise roots or stems 26, platforms 30, and airfoils 32, with the blade platforms defining pin apertures 34. Pins 16 include heads 36 and bases 40, and the base and head of each pin are spaced apart and connected together by stem 42. As will be readily apparent, pins 16 may, and preferably do, comprise conventional, easily available rivets of the type wherein base 40 may be expanded by means of an internal break mandrel (not shown) secured within the base and extending upward therefrom through the interior of stem 42 and head 36 and to the exterior thereof.

Discussing rotor disc 12 in greater detail, each blade groove 20 has a generally triangular form, and the surfaces defining the blade grooves include outwardly extending projections 44, forming what is generally referred to as a double dovetail or fir tree configuration. Tenons 22 are located between blade grooves 20 and define pin sockets 24, which radially extend inward from outside surfaces of the tenons.

Roots 26 of rotor blades 14 have a cross-sectional shape complementing the fir tree configuration of blade grooves 20; and, in assembly, the blade roots are disposed within the blade grooves so that rotor disc 12 securely holds the rotor blades against radial movement. Roots 26 terminate in platforms 30, and airfoils 32 project outward therefrom to engage a working fluid flowing past rotor blades 14. Platforms 30 overlie the outside surface of disc 12 and are positioned so that pin apertures 34 extend over, and preferably are aligned with, pin sockets 24. As clearly shown in FIG. 1, the axially extending side walls of each blade platform 30 span across rotor disc 12 generally parallel to the axis thereof, and preferably each side wall of a blade platform is adjacent to a side wall of a neighboring blade platform.

As previously mentioned, pins 16 lock rotor blades 14 to disc 12. More specifically, stems 42 radially extend through pin apertures 34 and bases 40 extend into pin sockets 24. Axial movement of rotor blades 14 is limited by abutment of pin stems 42 with surfaces of the rotor blades defining pin apertures 34 and by abutment of pin bases 40 with surfaces of rotor disc 12 defining pin sockets 24. Preferably, stems 42 closely fit against surfaces of blade platforms 30 defining pin apertures 34, and bases 40 closely fit against surfaces of rotor disc tenons 22 defining pin sockets 24, substantially preventing axial movement of rotor blades 14 within rotor assembly 10.

Heads 36 and bases 40 of pins 16 cooperate to secure the pins themselves in the locking position shown in FIG. 2. That is, heads 36 project over radially outside surfaces 46 of blade platforms 30, limiting radially inward movement of pins 16; and bases 40, in assembly, project below radially inside surfaces 50 of the blade platforms, limiting radially outward movements of the pins. Preferably, heads 36 and bases 40 tightly fit against blade platforms 30, substantially preventing radial movement of pins 16. Also, heads 36 are preferably disposed within recessed portions 52 of surfaces 46, substantially eliminating any effects the pin heads might have on the aerodynamics of the fluid flow past blades 14. Moreover, for reasons which will become apparent during the discussion of the removal of a blade 14 from rotor assembly 10, preferably the distance (shown as length "A" in FIG. 4) from the bottom of pin sockets 24 to inside surfaces 50 of blade platforms 30 is greater than the distance (shown as length "B" in FIG. 4) between the bottom of pin bases 40 to the top of pin stems 42.

To secure and lock a rotor blade 14 within rotor assembly 10, blade root 26 is axially slid into blade groove 20. The blade is positioned with platform 30 extending over tenons 22, and specifically with pin aperture 34 aligned with pin socket 24. Next, with base 40 of pin 16 in an unexpanded position shown to FIG. 3, the base is inserted in pin aperture 34. Pin 16 is moved radially inward until pin head 36 abuts against surface 46 of blade platform 30, bringing pin base 40 into pin socket 24. With base 40 extending into socket 26, the pin base is conventionally expanded by maintaining head 36 fixed and pulling upward on the previously mentioned internal break mandrel (not shown) extending from the interior of the pin base, upward through the pin head. This locks pin 16 into position and, thus, locks blade 14 into its position. Further, as base 40 expands, the pin base and pin head 36 are brought into a tight fit against blade platform 30, which, among other things, prevents or minimizes vibrations of locking pin 16 during operation of rotor assembly 10. To remove rotor blade 14 from rotor assembly 10, referring now to FIGS. 4 through 7, head 36 of pin 16 is removed, preferably by machining off the head. For example, drill 54, shown in FIG. 4, may be used to mill off head 36. If drill 54 is utilized, preferably the diameter of the drill equals the diameter of pin aperture 34, inter alia, to eliminate or at least reduce any contact between the drill and the surfaces of blade platform 30 defining the pin aperture in case the drill is lowered below top surface 46 of the blade platform. Next, stem 42 and base 40 of pin 16 are forced radially inward into pin socket 24 until, as shown in FIG. 5, the pin stem is radially below blade platform 30, unlocking blade 14 from rotor disc 12. With rotor blade 14 unlocked from rotor disc 12, the rotor blade is freed therefrom by axially sliding blade root 26 out of blade groove 20.

As will be understood, any suitable means may be employed to force stem 42 radially inward into pin socket 24. For example, threading tap 56 may be used first to form a threaded socket within pin stem 42 and then to push the stem into pin socket 24. If tap 56 is used via pin aperture 34 to force stem 42 into socket 24, the tap is removed from the pin aperture before blade 14 is slid out of disc 12. In addition, preferably, the width or diameter of pin socket 24 is greater than the width or diameter of pin aperture 34 to facilitate moving base 40 and stem 42 of pin 16 into the pin socket.

After blade 14 is removed, preferably pin stem 42 and pin base 40, still disposed within pin socket 24 as shown in FIG. 6, are removed from the pin socket to prepare motor assembly 10 either for the replacement of rotor blade 14 or to receive a new rotor blade. This may be done by simply pulling pin base 40 and pin stem 42 from pin socket 24. For example, with reference to FIG. 7, tap 56 may be reemployed to engage stem 42 and to pull the stem and base 40 from pin socket 24.

Thus, as may be appreciated from a review of the above discussion, Applicants have provided a unique rotor assembly 10 in which rotor blades 14 are securely locked in place in a very simple yet effective manner, requiring only inexpensive, easy to use, and readily available tools and equipment. With the present invention, it is not necessary, inter alia, to employ a locking pin having a peculiar, unique, or atypical shape. Further, it is not necessary to turn or rotate the locking pin itself into a locking position. This not only facilitates locking rotor blades 14 to disc 12 but also assists removing the rotor blades from the disc; and the blades may be removed from the rotor disc relatively quickly and easily, not requiring any special tools, extensive machining, or substantial amounts of labor. Moreover, all of the above advantages are accomplished while requiring access to only one side of the locking pin and while the locking pin is installed in an area of the rotor assembly where the stresses on the pin are relatively minor.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A rotor assembly comprising:
   a rotor disc defining a plurality of blade grooves, and including a plurality of tenons disposed between the blade grooves and defining a plurality of pin sockets radially
   a blade platform overlaying a tenon and defining a radially extending pin aperture aligned with the corresponding pin socket; and
   a plurality of locking pins radially extending through the pin apertures to secure the rotor blades against axial movement, each pin including
   a head projecting over and engaging an outside surface of a blade platform and
   an expanded base engaging an inside surface of the blade platform to fix the pin with respect to the blade, and a stem connecting the pin head and the pin base each of the expanded bases extending into and coacting with the corresponding pin socket to prevent axial movement between the blades and the disc.

2. A rotor assembly as defined by claim 1 wherein the distance between the bottom of the pin socket and the inside surface of the blade platform is greater than the distance between the bottom of the pin base and the top of the pin stem.

3. A rotor assembly as defined by claim 1 wherein:
the width of the pin socket is greater than the width of the pin aperture to facilitate moving the pin base and the pin stem into the pin socket.

4. A rotor assembly as defined by claims 2 or 3 wherein:
the outside surface of each blade platform defines a recessed portion; and
the head of each pin is disposed within a recessed portion.

* * * * *